United States Patent [19]
Jones et al.

[11] 3,807,590
[45] Apr. 30, 1974

[54] SEED COTTON STACKING METHOD

[75] Inventors: Joseph Kennedy Jones, Raleigh, N.C.; Milton Louis Smith, Lubbock, Tex.

[73] Assignee: Cotton, Incorporated, New York, N.Y.

[22] Filed: July 19, 1972

[21] Appl. No.: 273,041

Related U.S. Application Data
[62] Division of Ser. No. 193,326, Oct. 28, 1971, Pat. No. 3,703,966.

[52] U.S. Cl. .............................................. 214/152
[51] Int. Cl. .......................................... B65g 57/03
[58] Field of Search ........ 214/9, 152; 100/100, 233; 130/20; 56/346

[56] References Cited
UNITED STATES PATENTS

| | | | |
|---|---|---|---|
| 3,556,327 | 1/1971 | Garrison | 214/522 |
| 2,740,350 | 4/1956 | Frigieri et al. | 130/20 X |
| 3,135,267 | 6/1964 | Liebig | 214/9 X |

*Primary Examiner*—Frank E. Werner
*Attorney, Agent, or Firm*—Burns, Doane, Swecker & Mathis

[57] ABSTRACT

A seed cotton stacking apparatus with a mechanical compressor means pivotally attached adjacent the rear end of a slip form. The open top — open bottom slip form has upwardly extending side walls and a front end wall which define a cotton receiving zone. The side walls include outwardly flared, upper portions. The compressor means includes a crop contacting platen which has a generally planar central portion and downwardly sloping edge portions. The slip form is supported on longitudinally extending skids which are in ground contact during the rick forming process. A selectively operable wheel assembly is included to pivot a pair of wheels downwardly thereby lifting the slip form to a transport position from a skid position.

9 Claims, 9 Drawing Figures

SEED COTTON STACKING METHOD

This is a division of application Ser. No. 193,326, filed Oct. 28, 1971, which issued on Nov. 28, 1972 as U.S. Pat. No. 3,703,966.

BACKGROUND OF THE INVENTION

The invention relates to a crop stacking apparatus and method and more particularly to a method and apparatus wherein mechanically compressed seed cotton is placed in self-supporting field stacks.

The harvesting of cotton is usually carried on over a relatively short period of time of from four to six weeks. This is primarily due to the desirability of minimizing crop losses which may occur when the cotton is left on the plant after it matures. During this period, special purposed equipment which includes gins, mechanical harvesters and trailers are often employed. The trailers are utilized to receive cotton picked by the harvesters.

In the past, these trailers have been partially filled by the harvester and transported for ginning or temporary storage. Partial filling is intended to minimize excessive waiting time required for complete trailer filling. The trailers are usually returned to the field for further loads rather than utilized for storage. The temporary storage associated with such trailer operations is usually commensurate in time with the ginning season since the lack of economically efficient in process storage requires relatively instantaneous ginning. Thus, when the four to six week harvest is completed, the ginning season is also completed, but it is completed in a manner requiring the costs associated with short duration full time operation and the problems associated with operational dependance on the harvesting operations, i.e. a slowdown in the harvest is reflected at the ginning location.

Storage in trailers could alleviate the close relationship between ginning and harvesting seasons. However, since trailers are required in quantities consistant with the harvest, this may not be economically satisfactory by reason of the large capital expenditures associated with a large number of these trailers needed for transport and storage.

Attempts at increasing trailer utilization by placing full loads in the trailers have been generally unsuccessful. Filling the trailers to their capacity tends to slow down the harvesting operation primarily because the harvester dumping time approximately doubles for every additional dumping operation associated with a trailer previously loaded to about 60 percent of capacity. As earlier noted, this slowdown ultimately effects the ginning operation.

It would, therefore, be highly desirable to alleviate the dependence of the ginning operation upon the harvesting operation by providing for economically efficient in process storage of seed cotton. The method and apparatus of the present invention utilizes a slip form to accomplish this end.

The use of a slip form, i.e. an open-top and open-bottom container, to stack or rick cotton on the fields as a means for temporary storage has been attempted in the past. In the practice of rick formation the slip form is provided with raw seed cotton dumped from a harvester. The container or form is moved longitudinally along the ground after each filling to leave a continuous stack of seed cotton to be picked up subsequently.

Prior to longitudinal movement of the slip form to produce the continuous rick, manual compacting of the cotton within the slip form has, in the past, been relied upon in an attempt to increase the density of the mass of cotton therein. Such manual compacting is also intended to aid in the maintenance of rick integrity once the slip form is moved away.

As will be apparent, rick formation utilizing a slip form could prove especially advantageous in arid growing areas through significant reduction of the expenditures normally required for cotton handling systems, primarily because in process storage is provided with a rick forming system that might entail the use of only one relatively inexpensive slip form. In the past, however, realization of these advantages has been hampered through a variety of disadvantages associated with the practice of rick formation.

For example, the requirement of manual labor for tramping the cotton presents particularly significant problems. As will be appreciated, the costs associated with the time required to manually tramp the cotton dumped into the form often may be prohibitively excessive. The manual tramping time itself may result in an undesirable slowdown of the continuous harvesting operation. Additionally, a very low density and uneveness of compaction is often evidenced in the use of this procedure, and rick integrity is often unacceptable insofar as the cotton ricks may tend to crumble and come apart easily, the cotton scattering readily during high winds.

It would, therefore, be desirable to provide a novel cotton stacking method and apparatus which would enhance realization of the advantages provided by use of a slip form while also minimizing, through the provision for mechanical compaction, the problems associated with manual tramping.

The compacting of seed cotton by means of mechanical compressing devices has been earlier proposed as may be seen, for example in the disclosures of U.S. Pat. Nos. 3,215,291; 3,412,532; and 3,422,751. Although such devices may be acceptable for some purposes, they may not be acceptable under certain circumstances for a number of reasons. The compactors employed are directly associated with the cotton harvesting apparatus and are intended to increase the capacity of a bin on the harvester so as to enable the harvester to complete operations connected with a particular row of cotton. The compressor baskets pivot and dump the cotton compacted therein into crop receiving wagons or trailers for transfer from the field and subsequent ginning. It can be appreciated that harvesting devices utilizing these compressor baskets entail a relatively large expenditure of capital by requiring that a large number of crop receiving trailers be available. Also, these baskets are relatively complicated and of limited capacity. Mechanical compaction of other crops has also been proposed, as disclosed in a U.S. Pat. No. 3,556,327 which is primarily concerned with compaction to form a module of hay. As in the case of the other patents noted above, compaction associated with the device disclosed in that patent is not concerned with the particular impediments presented in the stacking of cotton with a slip form.

In this connection, it would be particularly desirable to provide for mechanical compaction in a rick forming operation while providing for essentially continuous rick formation and at the same time enhancing rick integrity and uniformity.

Additionally, it would be desirable to introduce further overall efficiencies in connection with the actual compaction operations performed during formation of such ricks. For effective mechanical compaction it can be appreciated that cotton deposited within the slip form should be positioned properly with respect to the compaction device prior to the actual compression. To this end, it is advantageous to pile up the cotton to a height in the slip form well above the final desired rick height and to position that cotton relatively uniformly across the width of the form at a zone for compression. To this end, the slip form is provided with sloping side walls that enhance orientation of cotton supplied to the slip form with respect to the compacting apparatus, while at the same time obviating the need for careful placement of the cotton such as might require valuable time tending to slow down a rick forming operation. A piror art Wallace U.S. Pat. No. 2,524,003 depicts outwardly angled sidewalls but in an environment unrelated to orientation of a crop with respect to a compactor and slip form combination.

OBJECTS AND SUMMARY OF A PREFERRED FORM OF THE INVENTION

It is therefore, a general object of the invention to provide a novel crop stacking method and apparatus which obviates or minimizes problems of the sort previously noted.

It is a further object of the present invention to provide such a novel method and apparatus wherein a slip form is employed in connection with mechanical compaction to provide for economical storage of a crop; and in the case of cotton to alleviate the dependance of ginning upon harvesting.

It is a particular object of the invention to provide such a novel method and apparatus which enhances essentially continuous formation of ricks of cotton utilizing a mechanical compressing device and also contributes to rick uniformity and integrity.

It is another object of the invention to provide such a novel cotton stacking apparatus wherein a slip form is provided with outwardly flaring side walls for improving the orientation of supplied cotton with respect to a compressor platen, while at the same time militating against the spillage of seed cotton.

It is yet another object of the invention to provide such a novel apparatus including a selectively operable wheel assembly to move a slip form from a skid position to a transport position.

A preferred form of the invention intended to accomplish at least some of the foregoing objects entails a method of stacking a crop, utilizing an open top and open bottom slip form provided with compressor means. The slip form is placed in a ground engaging position and crop, such as seed cotton, is supplied to a crop receiving zone bounded by side walls, a front wall and an open rear end of the form. The compressor is operated to compress the crop toward the rear end of the form in a stack forming zone portion of the crop receiving zone. Thereafter, the slip form is moved longitudinally forward in a direction away from the open rear end of the form to leave an unsupported portion of a continuous crop stack. The compressor is repeatedly operated in connection with continued supply of crop, and after each compressor retraction forward sliding of the slip form is repeated.

In a preferred apparatus of the invention, the walls of the slip form extend upwardly of the ground, the side walls being provided with ground engageable skid means. The compressor means is pivotally attached to the slip form adjacent the rear end thereof for compacting crop in the stack forming zone. Pivot means mounts the compressor means on the slip form for movement about a pivot axis through the stack forming zone. Preferably the pivot axis extends generally transversely of the slip form at a location spaced from the bottom thereof. In addition, the compressor means has a width substantially commensurate with the space between the side walls at the pivot axis location, and has a longitudinal extent less than that of the crop receiving zone and less than the distance of the pivot axis from the slip form bottom. Compressor operating means pivotally moves the compressor means about the pivot axis in an angular direction toward the open rear end of the slip form to compress crop in the stack forming zone. The operating means also retracts the compressor means.

Selectively operable door means is provided for selectively closing the rear end of the slip form. In addition, selectively operable wheel assembly means attached to the form adjacent the side walls is operable to selectively support the slip form in a transport position with the skid means raised from normal ground engaging position.

The side walls may flare outwardly of the slip form at a location above the pivot axis of the compressor means to aid in orienting supplied crop with respect thereto. The platen of the compressor means may include a generally planar central packing portion and side portions sloping oppositely outwardly of that packing portion.

THE DRAWINGS

Other objects and advantages of the present invention will become apparent from the subsequent detailed description thereof in connection with the accompanying drawings in which like numerals designate like elements, and in which.

DETAILED DESCRIPTION OF THE PREFERRED EMBODIMENT

With reference now to FIGS. 1 through 8, a preferred form of a method and apparatus for forming a crop stack in the field may be more fully understood in connection with the formation of a rick of seed cotton.

Figure 1:
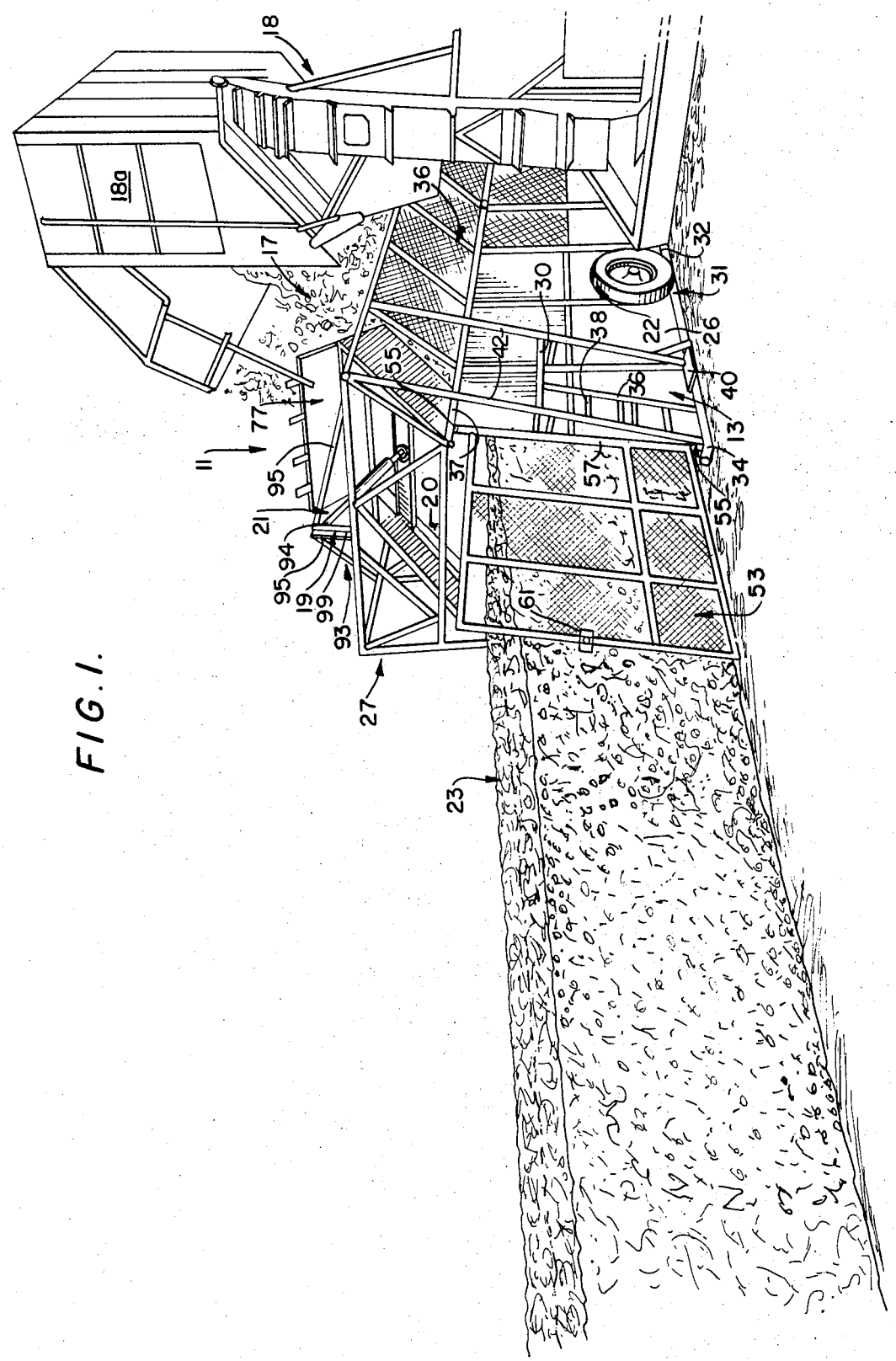
FIG. 1 is a perspective view depicting a rick forming process according to the present invention with a preferred form of a cotton stacking apparatus.
Figure 2:
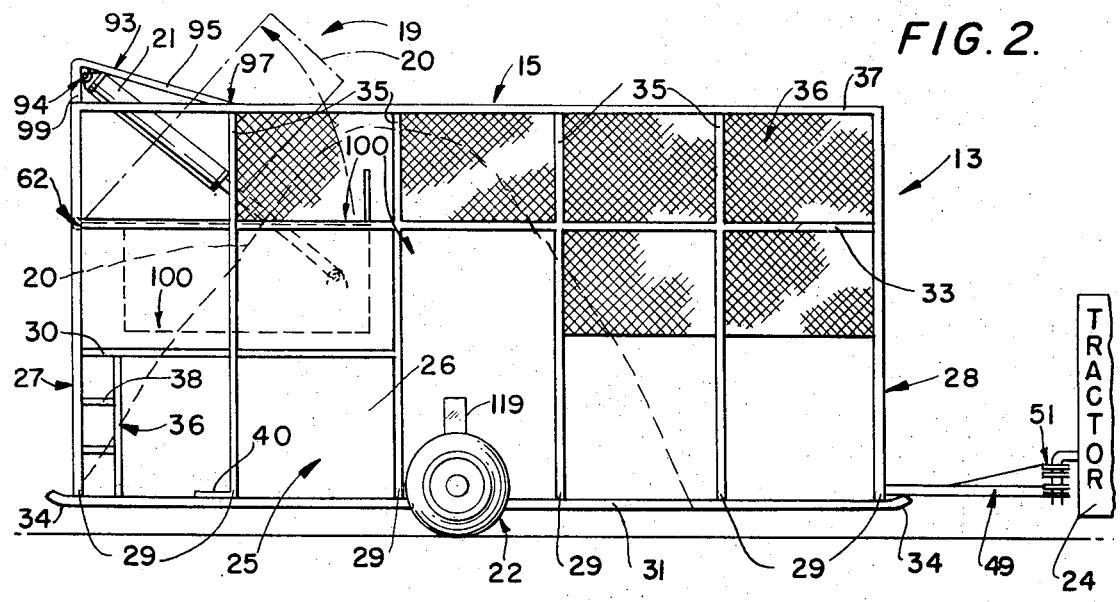
FIG. 2 is a side elevation view of the stacking apparatus of FIG. 1 with a schematic illustration of placement of that apparatus in a transport position.

As may be seen in FIGS. 1 and 2, the formation of such a rick is accomplished utilizing a crop stacking apparatus 11 including a ground engageable slip form 13 having an open top and an open bottom and defining internally thereof a crop receiving container or zone indicated generally at 15. The crop 17, which is preferably seed cotton, is appropriately dumped into the form 13 from above by a conventional harvesting device 18. The cotton is piled up within the form directly below a mechanical compressing means 19 which includes a compressor platen 20 and a selectively operable power device 21 which functions as a compressor operating means that pivots the platen to compact the cotton into a coherent body within the slip form 13.

After the supplied cotton reaches a predetermined height and is compacted, the form is moved forward by a tractor 24. In this fashion, an incremental addition of a length corresponding to the length of the compressing platen 20 is made to the self-supporting, continuous rick 23 of cotton. Upon completion of a desired rick length to be stored free standing in the field, a selectively operable wheel assembly means 22 may be activated to facilitate transport of the slip form 13 to other locations.

Figure 3:
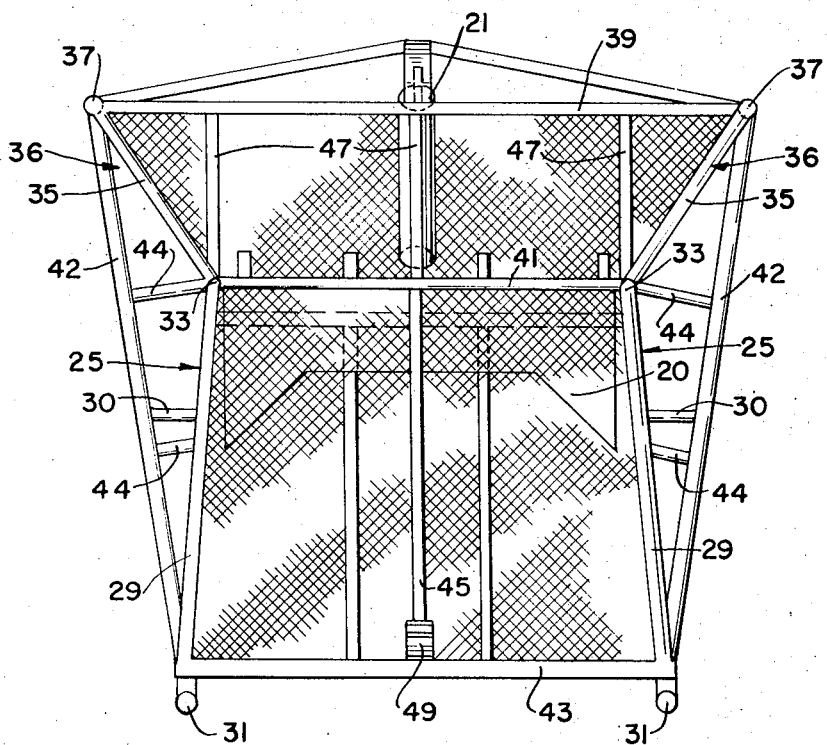
FIG. 3 is a front end view of the stacking apparatus of FIG. 1.

With continued reference to FIGS. 1 and 2 and with reference to FIG. 3, it may be seen that the slip form 13 comprises a generally upright pair of lateral side walls 25 and a generally upright pair of end walls 27 and 28 which extend upwardly from adjacent the ground to define the cotton receiving area 15. The side walls 25 include a plurality of upright members 29 which extend generally vertically from a longitudinally extending skid means 31. As can be seen in FIG. 1, the skids 31 are normally in ground contact during the rick forming operation.

As will be apparent, although six such upright members 29 are illustrated, additional or fewer members may be provided. At their upper ends, the uprights 29, which may, for example, take the form of tubular steel, may be connected to longitudinally extending supports 33 arranged generally parallel to the skids. The uprights 29 may be secured between the skids 31 and the supports 33 by any suitable means such as by welding.

The side walls 25 are preferably arranged to incline slightly inwardly (see FIG. 3) toward one another thus narrowing the crop receiving area from the skids toward the top of the uprights 29. This inward slope of the tubular members 29, as will later be more fully appreciated, aids considerably in maintaining the free standing stack in a coherent body when the rick is left on the field unsupported. The larger base and tapered side walls are found to reduce crumbling and prevent the rick side walls from toppling after extended storage. The upper surface of the rick may have, for example, a width of about six feet eight inches while the base may have a width of about eight feet when initially formed. Subsequent settling may take place tending to even this dimensional difference.

The frame of the slip form 13 provided by the uprights 29, etc. may in part be covered with a screen-like cover or wire mesh completing the slip form walls. The cover insures that cotton deposited in the form will remain therein, while allowing trapped air to escape. Preferably, however, a sheet metal liner 26 is also included to cover certain portions of the framework, particularly those adjacent the compressor platen 21, thereby facilitating the formation of a smooth stack, i.e. a rick with generally even sides. The front end wall of the form is preferably covered solely with the wire mesh so that the tractor driver will be able to view the compaction operation without obstruction.

The skids 31 run generally longitudinally of the slip form with the bottom of the central portion 32 thereof in contact with the ground during the rick forming operation. The two end portions at 34 of these skids are curved slightly upwardly to facilitate sliding of the skid along the ground. As will later be more fully appreciated, the skid slides forward during the rick forming operation but occasionally may be slid rearwardly when the rick forming operation is commenced or completed.

The upper portions 36 of the side walls flare outwardly at an angle from the supports 33. These upper portions 36 may include frame members 35 which are in general alignment with the uprights 29 but are arranged at an obtuse angle therefrom (see FIG. 3). An additional support member 37 interconnects these frame members 35 and runs generally parallel to supports 33 and the skids 31. The outwardly flared side walls disposed above the pivot axis of the platen 20 aid in positioning the cotton dumped into the form under the platen in a manner hereinafter discussed more fully. Additionally, the flared side walls, by providing a greater area at the uppermost portion of the slip form, prevent spillage of cotton during rapid dumping from the harvester 18.

Extending between the uprights 29, a platform 30 of a strength suitable for supporting a workman is provided. This platform is arranged generally at the midpoint between the skid 31 and the support member 37 and is substantially parallel to the ground. A metal ladder 36 including rungs 38 may also be provided to facilitate access to the platform 30. An additional supporting step 40 may also be included. It will be appreciated that the platform 30, step 40 and the ladder 36 are included to give the workman easy access to the various components of the slip form both during the rick forming process and for periodic maintenance as desired.

Truss beams 42 extend upwardly from the skid 31 directly to the upper frame support members 37 on each side of the form. These beams may be spaced from the side wall 25 by braces 44. The beams 42 are particularly desirable at the rear end of the form adjacent the stack forming zone portion of the crop receiving zone 15. These beams give added strength to the slip form frame as the platen 20 moves through the stack forming zone and also conveniently serve to support a portion of the platform 30.

The end wall 28 at the front end of the form 13 and adjacent the tractor 24, also extends upwardly in a generally vertical manner. In a manner similar to the side walls, the slip form 13 may, at the front wall 28, be provided with generally horizontal braces 39, 41 and 43.

These horizontal braces are joined with the side walls 25 at longitudinal supports 37, 33, and just above the skid 31, respectively. A plurality of substantially vertical parallel beams 45 and 47 may also be provided for additional strength. The beams 47 join the braces 39 and 41 and as in the case of the other frame members are preferably secured therebetween by welding to provide an integral frame for the slip form.

If desired, the upper portion of the end wall at 46 may also flare outwardly (not shown) in a manner similar to that of the side walls. This flaring of the end wall may sometimes be desirable in preventing spillage over the front of the slip form 13.

A trailer hitching device 49, of conventional design, extending outwardly from the central support 45 at the front wall 28 and may be provided with suitable apertures 51 therein to facilitate removable attachment of the slip form 13 to be pulled longitudinally along the skids 31 during the rick forming process and to permit backing up of the slip form 13 when desired.

During the major portion of the rick forming operation the rear end 27 of the slip form is open from the ground between the skids 31 to the pivot axis of the compressor platen 21. In the illustrated embodiment the slip form is provided with a selectively operable door or gate means 53 (see FIG. 1) to provide an end wall for closing the rear end of the slip form at the beginning of the rick forming process as hereinafter more fully described. It should, however, be noted that the rear end of the slip form may be permanently open as will later be more clearly understood. At any rate, where the door or gate 53 is employed, it remains open after the rick forming process is commenced. The door or gate 53 may be pivotally hinged between the skid and one of the braces 44, as indicated at 55, in any suitable manner. A latch 61 of any suitable design may also be included on the opposite side of the gate 53 to keep it closed during commencement of rick formation and during subsequent transport to the slip form to remote locations.

Figure 4:
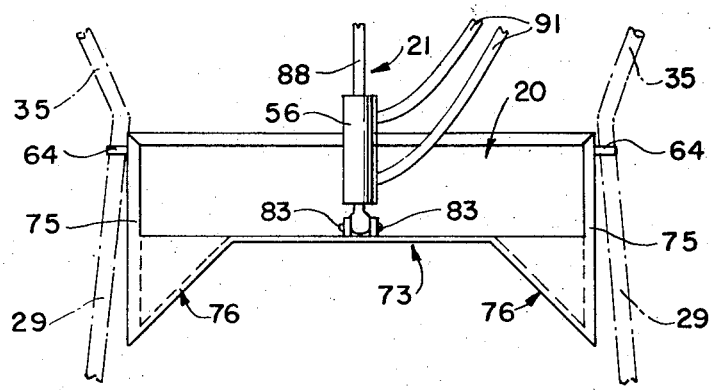
FIG. 4 is a schematic representation of the mechanical compaction mechanism incorporated in the stacking apparatus of FIG. 1.
Figure 5:
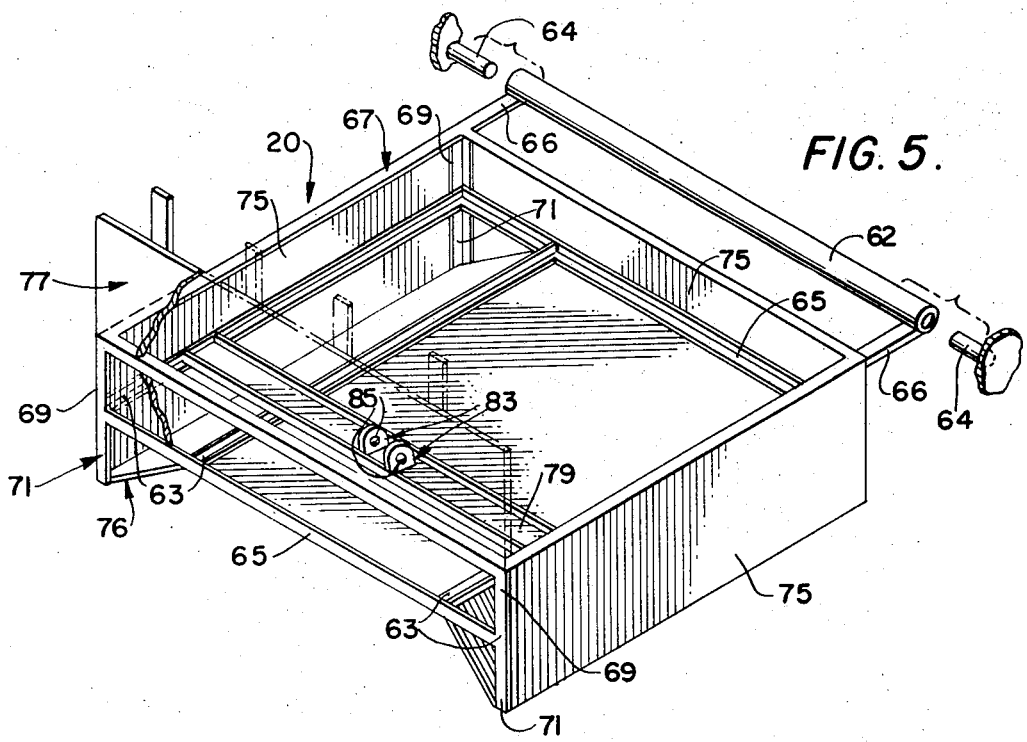
FIG. 5 is a detailed view of the mechanical compacting mechanism incorporated in the stacking apparatus of FIG. 1 according to the present invention.

As may be seen in FIGS. 4 and 5, the platen 20 is pivotable adjacent the rear end of the slip form about a pivot axis defined, for example, by a pair of pins 64 which are in general vertical alignment with and parallel to the front brace 41. These pins may be journalled within a pivot bar sleeve 62 which is spaced from the platen 20 by means of extension members 66. In the preferred embodiment of the invention the platen, therefore, is pivotable about an axis extending transversely of the slip form about an axis spaced from the slip form bottom, which axis extends between the side walls 25. This axis is preferably disposed below the flared portions 36 of the side walls and may be located at the rearmost end of the slip form.

The illustrated platen 20 is framed along its length with four brace members 63 and along its width with braces 65. These braces may be constructed of angle iron and may be further strengthened by a box-like frame 67 spaced upwardly therefrom. The frame 67 and the braces 63 and 65 are joined at the four corners by means of supports 69. A portion of these supports 69 project downwardly from the plane formed by the braces 63 and 65 as indicated at 71.

A central packing surface 73 of the platen 20 is preferably provided. In addition, two sloping side sections 75 of the platen provide side platen portions 76 sloping oppositely outwardly from the central section 73 and supported by the projecting portion 71 of the support. The platen central and side portions 73 and 76 may be formed of metal suitably secured to the previously described framework as by welding. The illustrated configuration of these portions has been found to be preferable when compressing and packing the cotton within the form to obtain a tight free standing rick. The downwardly slanted edges of the platen, which provide a width extension substantially equal to the spacing between the form side walls at the pivot axis location (see phantom illustrated in FIG. 1), adequately forms the top side edges of the rick and packs the rick inwardly at these locations to further aid in preventing the unsupported stack from coming apart after extended storage.

The forward portion 77 of the platen 20 extends upwardly somewhat above the framework supporting the compressing surfaces. This extension projects (see FIG. 1) upwardly at about a 90° angle from the central compressing surface 73 and aids somewhat in preventing cotton from falling behind the platen both while it is being compacted and when it is dumped into the form.

With continued reference to FIG. 5, it may be seen that the platen may also be provided with a brace 79 which extends transversely across the platen width and is suitably secured to the longitudinal members 63, as by welding. This brace 79 also includes a pair of upwardly projecting ear-like brackets 83 having aligned holes 85 therethrough. The compressor operating means 21 which may be in the form of an hydraulic actuator is pivotally secured to the platen 20 at these ears 83 by means of a pin (not shown) which projects through the holes 85. It will be appreciated that a pneumatic actuator or other conventional power means 21, may be effectively employed as a compressor operating means.

The illustrated operating means 21, of conventional design, includes a cylinder 86 secured at one end between the projections 83 and a piston assembly 88 slidably received in the cylinder 86. Hydraulic lines 91 are preferably suitably powered from the tractor 24 and serve to cause the actuator 21 to pivot the platen 20 about the axis extending centrally of the sleeve 62. The power means 21 illustrated also functions to retract the platen.

With renewed reference to FIG. 1, it may be seen that a truss assembly 93 suitably pivotally supports the piston assembly 88 as indicated at 94. This truss assembly includes support members 95, secured to an upper portion of the flared side wall portions 36 at 97, and a central support column member 99 suitably fastened to the slip form frame. The truss assembly 93 serves to support the actuator 21 and further braces and strengthens the frame of the slip form during the pivoting of the platen 20.

Figure 6:
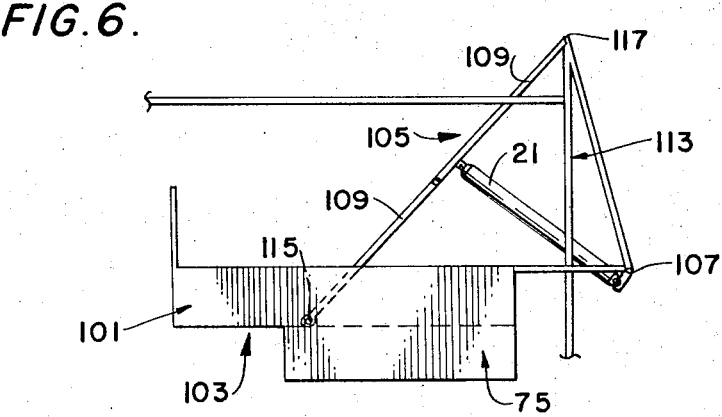
FIG. 6 is a side elevation of an alternate form of a mechanical compacting mechanism for incorporation in the stacking apparatus of the present invention.
Figure 7:
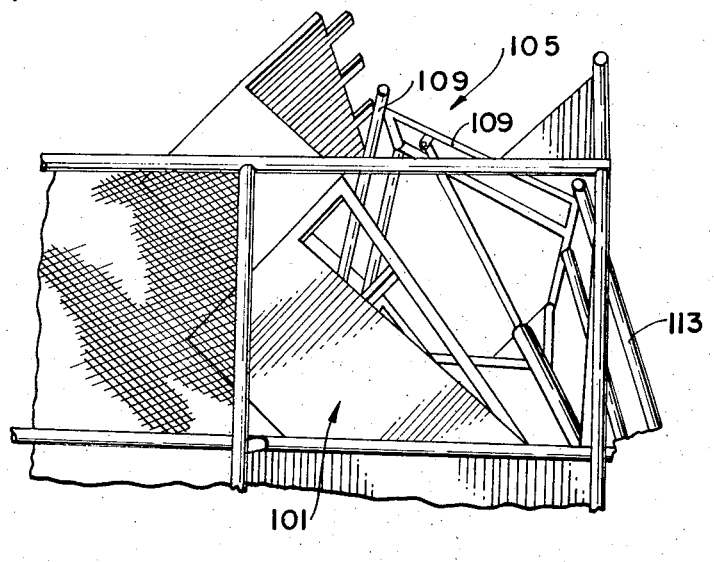
FIG. 7 is a side elevation view of the mechanical compactor of FIG. 6 with the compressing platen in its raised position.

It will be appreciated that various other linkage mechanisms may be provided to pivot the platen toward and from its cotton compacting position. Also, other compressing platen configurations may be utilized to tightly compact the cotton. One such alternate embodiment is illustrated in FIGS. 6–7.

A platen 101 is provided with a frame very similar to that shown in FIG. 5. This platen 101, however, is provided with a projecting planar frontal section 103 which extends across the platen width. The sloping side portions 75 of the platen extend only along a rear portion thereof. The projecting portion 103 may provide secondary compression and may also tend to feed the main compressing portions of the platen.

The actuator assembly 105 illustrated in FIGS. 6 and 7 also differs somewhat from that discussed with reference to FIG. 5. In this connection, the actuating device 21 may be suitably pivoted adjacent the axis 107 of platen rotation corresponding to that platen pivot axis earlier discussed. Two linkage arms 109 are pivotally joined and located approximately at the midpoint between a bracing truss assembly 113 and the pivotal attaching point on the platen indicated at 115. The linkage is also hinged at 117 on the truss assembly 113. Extension of the actuator 21 (see FIG. 7) will pivot the platen upwardly in a scissor like fashion about its axis at 107. Retraction of the actuator will straighten the linkage, as can be seen in FIG. 6, and pivot the platen into a cotton compacting position.

Figure 8A:
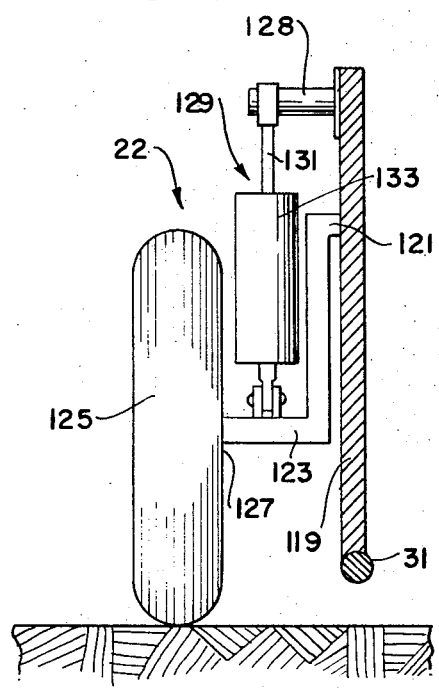
FIGS. 8A and 8B are respectively detailed elevational views of a mechanism for selectively placing a wheel assembly of the apparatus of FIG. 1 in ground engagement and retracted position according to the present invention.
Figure 8B:
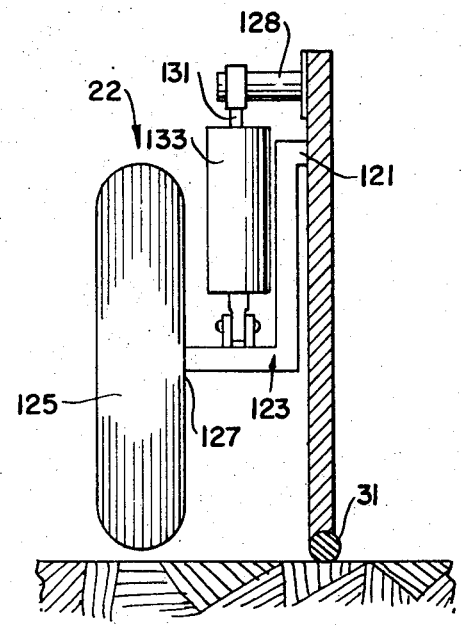

With reference now to FIGS. 8A and 8B, one form of the previously noted, selectively operable wheel assembly means 22 for shifting the slip form from a ground engaging rick forming position (FIG. 1) to a transport position (FIG. 2) may be more fully understood.

A brace member 119 (see also FIG. 2) extending upwardly from the skid 31 may be provided for supporting the assemblies 22. This brace may be of heavy gauge metal and welded to the skid. Pivotally hinged at 121 within this brace 119 is an S shaped linkage 123. This linkage has a conventional tire 125 rotatably supported at 127. The tire rolls freely when in the ground contact position shown in FIG. 8A.

A pin member 128 extends outwardly from the brace 119 and is spaced above the linkage 123. This pin member is fixedly secured to the brace 119 by any suitable means, such as by welding. Situated between the pin 128 and the linkage 123 is a power actuator 129 which may be of the hydraulic or pneumatic type. This piston assembly 131 and the cylinder 133 of this actuator are pivotally journalled on the pin 128 and the linkage 123, respectively. Activation of this actuator 129, for example through hydraulic lines (not shown) extending from the tractor 24, will extend the actuator 129 and downwardly pivot the wheel 125 into the ground engaging contact (FIG. 8A). This contact will tend to lift the central portion of the slip form (see FIG. 2). Retraction of the piston assembly 131 within the cylinder during rick forming operations, will tend to upwardly pivot the wheel 125 and permit lowering of the slip form 13 until the skids 31 are in ground contact as illustrated in FIG. 8B.

It is to be understood that the slip form is provided with two similar wheel assemblies 22 on either side thereof. Advantageously, the wheel assemblies do not interfere with the central portion of the slip form 13 which is entirely open and free to receive and stack seed cotton without interference. While a pivotal assembly is shown in the preferred embodiment it is to be understood that various other suitable positioning devices for the wheels 125 may be employed. For example, vertically operable jacks or a central actuator may be suitable under certain circumstances. Importantly, the wheels should be easily movable from a skid to a transport position and should be arranged so as not to greatly interfere with the rick forming operation.

OPERATION AND SUMMARY OF ADVANTAGES

From the foregoing, a preferred crop stacking method with the previously described apparatus may be more fully understood.

Initially the slip form 13 may be transported to the field for the beginning of a rick forming process by means of the tractor 24. This transportation is facilitated by means of the hitching device 49 and the wheel assemblies 22. With the slip form still supported by the wheel assembly and with the tractor and slip form in a stationary position the weight of the compressing means 19 and the frame of the slip form is such as to cause the slip form to tip rearwardly (not shown) and rest on the rear portion of the skid at 34. During the wheel assembly supported transportation of the slip form to the desired location, however, the slip form assumes a generally horizontal posture as shown in FIG. 2.

Once the slip form is positioned properly in the field the wheels are caused to pivot upwardly through the retraction of the actuator 121 so that the skids 31 are lowered to their ground engaging position shown in FIG. 1.

To commence rick formation the gate 53, if employed, is normally maintained in its closed position by means of the latch 61 or the like. Seed cotton is then dumped there into from either side by one or more harvesters 18.

The harvester 18 may be of a conventional type which includes a conventional dumping bin 18a. This bin is elevated and pivoted in a conventional manner. Rapid dumping is facilitated by the outwardly flaring upper side wall portions 36 insofar as the harvester need not be brought into direct abutment with the lower side wall portions to insure placement of cotton in the crop receiving area 15 without precise orientation of the bin. As earlier noted, the flared side walls also aid considerably in preventing loss of cotton over the sides.

The seed cotton 17 being dumped into the slip form 13 will fall downwardly until it contacts the ground and lies within the slip from framework. The seed cotton will begin to pile up below the compressor platen 20 in the stack forming zone 100 (FIG. 2) defined therebelow. This stack forming zone may be considered to be defined across the width of the slip form in the space through which the platen 20 is movable. An increase in height of the supplied cotton causes the upper periphery of the cotton pile to eventually abut the compacting surfaces of the retracted platen 20. As will be appreciated, increases in the pile height has a tendency to increase the base area of the pile in order to support this height. Once the pile reaches the height of the platen the pile of cotton will generally extend from an area adjacent to the closed gate 53 to well in front of the compressor platen 20. (see phantom illustration in FIG. 2).

In the initial formation of the cotton stack, it may be desirable to slide the slip form forward by a suitable distance to allow the cotton within the stack forming zone 100 to be forced against the rear gate 53 to cause more favorable positioning of the initially supplied cotton relative to the platen 20.

At any rate, the platen 20 is, at an appropriate time, selectively activated and swung downwardly to compress the cotton thereunder. This compaction operation may be repeated several times to attain the desired crop density. In practice the density of the cotton packed has been found to be approximately 6.7 pounds per cubic foot. Once the compaction has been completed the platen is raised and the rear gate is swung open as can be more clearly seen in FIG. 1. This slip form is then slid forward by a length approximately equal to the length of the platen 20. After the beginning of this rick the rear gate is no longer needed and may be, if desired, removed.

When utilizing a slip form 13 without a gate 53 and with a permanently open rear end, the cotton would be compacted after it has reached the desired height. The forward or leading edge of the rick would be somewhat loosely compacted when an open end is used in the initial compression strokes. The amount of cotton of lower density, however, is relatively small when compared with the amount of cotton in the entire rick. To facilitate initial rick formation, the slip form may, if desired, be moved rearwardly after the first several dumps of seed cotton to smooth out the pile and orient it more favorably for initial compression by the platen 20.

After the initial rick forming procedures, an essentially continuous rick formation operation takes place. The dumping operation is repeated with cotton being deposited within the zone 100 and being properly positioned between the ground and the upwardly pivoted platen 20 by the outwardly flared side walls 36. It can be appreciated that after this initial compaction operation is completed, the seed cotton will tend to fall further forward in the slip fom and may contact the lower surfaces of the front end wall 28. The area under the platen will constantly be supplied with raw seed cotton after periodic forward longitudinal sliding of the form along the ground.

The outwardly flared side wall portions 36 aid considerably in orienting the dumped cotton favorably relative to the platen for compaction. By permitting rapid dumping (because the bin 18a may be opened rapidly with its pivot point easily positioned inward of the top of the flared sides so as to reduce the danger of spillage), and by providing a wide space for the falling cotton to spread out beyond the platen width, the flared side walls tend to insure that a relatively uniform level of cotton is provided underneath the platen in the stack forming zone 100. As will be apparent, dumping is performed at a location adjacent the platen 20 for best results.

Throughout the rick forming process the platen 20 is periodically moved in an angular direction toward the rear end of the slip form to compress crop in the stack forming zone 100. Significantly, the preferred orientation and operation of the platen 20 is believed to enhance rick uniformity and integrity by providing compaction not only with a downward force component but also with a positive rearward force component reacted by the previously formed end of the rick.

At this juncture, it may also be noted that preferably the platen 20 has a longitudinal extent less than the crop receiving zone 15 (i.e., the stack forming zone portion 100 of the receiving zone 15 is located only adjacent the rear end of the slip form 13) and less than the distance of the platen pivot axis from the bottom of the slip form. Such dimensional criteria are also believed to enhance rick integrity and uniformity of compaction.

When the rick is to be completed and the last compaction of seed cotton within the form has been accomplished, the tractor is operated to side the slip form 13 rearwardly so that the front endwall will tend to compact the rick longitudinally along the length thereof, and will aid in preventing crumbling along the forward wall of the unsupported completed rick. The free standing cotton may be gathered by ginning at a later date in any suitable manner.

Thus it may be seen that according to the present invention a novel improved crop stacking apparatus including a slip form having mechanical compressing means is provided.

Particularly significant is the fact that the utilization of this compactor provides a relatively even density of compaction and allows for the practical employment of an essentially continuous rick formation for in process storage of crops such as seed cotton. In this connection, the compressor platen orientation and dimensions relative to the slip form are of considerable aid.

Of additional significance is the provision of the flared sidewalls on the slip form which serve to aid in properly orienting the cotton dumped into the form from the harvester under the compressing means.

Also of importance is the provision for selectively operable wheel assembly means for providing both a skid and transport position, the latter being convenient particularly in highway travel.

Although the present invention has been described in connection with a preferred form thereof, it will be appreciated by those skilled in the art that additions, modifications, substitutions and deletions not specifically described may be made without departing from the spirit and scope of the invention as defined in the appended claims.

What is claimed is:

1. A method of stacking a crop, the method utilizing an open top and open bottom slip form provided with a compressor means, the method comprising placing the slip form in a ground engaging position with said open bottom exposing the ground surface to the interior of said slip form, said slip form having a front wall, side walls, and an open rear end;

supplying crop to a crop receiving zone bounded by said side walls, said front wall and spaced from said open rear end of the slip form, said compressor means being adjacent said rear end;

operating the compressor means intermittently to compress crop adjacent the rear end of the slip form in a stack forming zone spaced rearwardly of the crop receiving zone;

sliding the slip form longitudinally along the ground in a direction away from the open rear end of the slip form while the compressor means is inoperative to leave an unsupported portion of a continuous crop stack; and repeating the steps of supplying crop, operating the compressor, and sliding the slip form.

2. A method of temporarily storing a crop comprising:

depositing said crop in a slip from having continuous sidewalls and a bottom opening, said slip form also having a front wall and an open rear end, compressing the crop intermittently by moving a platen in opposition to the ground underlying said bottom opening adjacent said rear end, thereby compressing the crop into a coherent rick adjacent said rear end while leaving the crop adjacent said front wall uncompressed, and sliding the slip form forwardly relative to the ground a distance corresponding to the length of a rick compressed by said platen, leaving behind at least a portion of the crop compressed in said rick.

3. The method according to claim 2 wherein said slip form has a top opening forwardly of said platen, and said depositing step includes passing said crop through said top opening into said slip form.

4. The method according to claim 2 wherein said slip form includes a door movable to close said rear end of said slip form, and including the steps of closing said door before compressing the crop and opening said door before sliding the slip form longitudinally.

5. The method according to claim 2 wherein said compressing step is performed alternately with said sliding step.

6. A method of stacking seed cotton and the like subsequent to harvesting by harvesting vehicles having temporary storage receptacles thereon, the method comprising:

positioning a slip form on the ground, said slip form having an opening at one end and a cotton receiving opening in the top and bottom opening substantially throughout the length of the slip form, discharging harvested seed cotton from said vehicles through said receiving opening and into said slip form, compressing the cotton adjacent said one end between a movable platen on said slip form and the ground under said bottom opening, while allowing the remainder of said cotton in said form between said platen and the opposite end of said form to remain substantially uncompressed, and subsequently advancing said slip form longitudinally relative to the ground, thereby positioning said platen over cotton previously deposited in said slip form.

7. The method of stacking seed cotton and the like according to claim 6 wherein said compressing step is performed by swinging said platen through said receiving opening about a fixed axis on said slip form.

8. The method of stacking seed cotton and the like according to claim 6 wherein said positioning step includes:

transporting said slip form on ground engaging wheels and subsequently disengaging said wheels from the ground, thereby allowing said slip form to rest on the ground.

9. The method according to claim 1 wherein said compressor means includes a movable platen in said open top adjacent the rear end of the slip form, and wherein said operating step includes swinging said platen through said open top about a fixed axis on said slip form.

* * * * *